United States Patent [19]

Kropp

[11] Patent Number: 4,719,753

[45] Date of Patent: Jan. 19, 1988

[54] SLIDE VALVE FOR LOAD SENSING CONTROL IN A HYDRAULIC SYSTEM

[75] Inventor: Walter Kropp, Sulzbach/Main, Fed. Rep. of Germany

[73] Assignee: Linde Aktiengesellschaft, Wiesbaden, Fed. Rep. of Germany

[21] Appl. No.: 832,122

[22] Filed: Feb. 20, 1986

[30] Foreign Application Priority Data

Feb. 22, 1985 [DE] Fed. Rep. of Germany ....... 3506294

[51] Int. Cl.[4] .................................... F16D 31/02

[52] U.S. Cl. .................................... 60/445; 60/427

[58] Field of Search ................. 91/446, 447, 525, 526, 91/528, 420; 60/420, 450, 445, 452, 427, 426; 137/596, 625.68, 596.13

[56] References Cited

U.S. PATENT DOCUMENTS 4,122,865 10/1978 Budzich .......................... 137/596.13

4,187,877 2/1980 Hodgson et al. .......... 137/625.68 X 4,617,798 10/1986 Krusch et al. .................... 91/446 X

FOREIGN PATENT DOCUMENTS 3044144 11/1980 Fed. Rep. of Germany .

3413866 4/1984 Fed. Rep. of Germany .

*Primary Examiner*—Edward K. Look

*Attorney, Agent, or Firm*—Karl F. Ross; Herbert Dubno

[57] ABSTRACT

A hydraulic or the like drive system which can include a variable-speed pump with at least one control element. The control element can be connected to a pump control piston arranged in a pump control cylinder, the position of which is determined by a control pressure. The drive system can further include a conveying conduit connected to the pump and a return conduit which leads to the respective reservoir, and can furthermore include control elements, with the conduit emanating from the pump are connected—by intervention of a respective branch line—several demand points which respectively can be connected to the conveying conduit by means of an in the respective branch line arranged, randomly movable valve. The valve has two auxiliary pistons arranged in the main piston of the valve and each auxiliary piston houses a reversing piston.

13 Claims, 9 Drawing Figures

SLIDE VALVE FOR LOAD SENSING CONTROL IN A HYDRAULIC SYSTEM

FIELD OF THE INVENTION

My present invention relates to a slide valve which can be used in a hydraulic, especially a hydrostatic drive system.

BACKGROUND OF THE INVENTION

More particularly, the present invention is concerned with a slide valve or similar hydraulic control valve which can be used in hydraulic, especially hydrostatic, drive systems having load-sensing means, and equipped with parallel pressure regulators, or throttles and the like means, disposed in the branch lines or conduits which connect the individual consuming, load or demand points or locations with a common pump.

The parallel pressure regulators serve to ensure that the respective throttle-opening velocity is always in conformity with the clear or effective opening or flow cross section for the particular load, even in the case of simultaneous operation or actuation of several loads or taking place at several demand points, and independently of the pressures experienced at the individual demand points, as is known from German Patent Publication DE-OS No. 30 44 144.2.

The invention is also based on state of the art as represented by German Patent Publication DE-OS No. 34 13 866.

In the latter system, which has been found to be highly effective, there still arise some drawbacks. For one, the pressure in the common control line or conduit (load-sensing-signal or load-sensing pressure) is varied on actuation or contacting of a further parallel demand point. This actuation or contacting is carried out with a greater or incremental pressure due to the pressure of the spring against which the second auxiliary piston—which is disposed towards the outer end of the main piston in accordance with DE OS No. 34 13 866—is supported with respect to or in an exterior manner. Accordingly, the load-sensing signal will be affected by the system or demand pressure and by the pressure of this spring. The force of the spring contributes to the generation of a value which functions as an unreliable and undesirable load-sensing signal.

Furthermore, in the earlier valves there exists the danger that the operation or functioning will be detrimentally affected by forces due to the fluid flow and undue pressure differences.

The control valve can be employed in a hydraulic and the like drive system, said system including a variable-speed pump with at least one control element, and said control element being connected to a pump control piston arranged in a pump control cylinder. The position of the piston can be determined by a control pressure. The drive system can further include a conveying conduit connected to said pump, and a return conduit which leads to the respective reservoir. The drive system is also characterized by control elements, whereby at the conduit emanating from the pump are connected—by intervention of a respective branch line—several demand points which respectively can be connected to the conveying conduit by means of an in the respective branch line arranged, randomly movable valve, and in each branch line there is provided an adjustable parallel control throttle position or the like means.

The control or adjustment element of each of these parallel control throttle positions or means can be impacted on the one side by the pressure prevailing in the conveying branch-conduit and on the other side by the control pressure and a spring. The control pressure is substantially the same at the parallel control throttle locations at the associated demand points. The control pressure impacted side of the control element of the parallel control throttle location—via a control pressure branch conduit—is connected to a common control pressure conduit, whereby in the respective conveying pressure branch line, there is formed a controllable indicator throttle location in the valve. In the flow direction behind this indicator throttle location the control pressure branch line is connected. On at least one side of the piston in this there is provided a longitudinal bore in which is mounted an auxiliary piston which can be moved against the force of a spring. The auxiliary main piston together with a part of the piston of the valve forms the parallel control throttle.

OBJECTS OF THE INVENTION

It is an object of the present invention to provide a slide valve for the purposes described and which can be used in the application described in DE-OS No. 34 13 866 having improved operating capabilities and devoid of disadvantages of the prior art.

It is also an object of the invention to provide a valve which is of relatively simple design.

It is still another object of the invention to provide a valve which has fewer individual components when compared to hitherto known similar systems.

It is also an object of the invention to provide a valve for the purposes described which can be economically manufactured.

SUMMARY OF THE INVENTION

These and other objects are attained in accordance with the invention by providing a reversing piston chamber in the respective auxiliary piston. A reversing piston can be shifted in its chamber due to a pressure medium effective at its respective forward end and due to an annular groove surrounding the central rod portion of each reversing piston.

In accordance with one aspect of the invention, in the central region of the reversing piston chamber there merges a transverse bore which is connected to the common control pressure line, via the respective load-sensing line.

Laterally disposed with respect to this transverse bore there are provided two more transverse bores. One transverse bore, which is disposed closest to the spring-biased end of the respective auxiliary piston, is connected to the forward end of the auxiliary piston, i.e., the end which is facing away from the spring-biased end. The other transverse bore is connected by way of a jet-nozzle formation with the spring-biased end of the respective auxiliary piston.

In accordance with another aspect of the invention, the respective forward end of the reversing piston chamber is connected, via a bore which is in communication with a transverse bore in the main piston, with a further transverse bore to be connected with the respective conduit leading to a demand point. The space in front of the rearward end of a respective auxiliary piston is connected, by way of a longitudinal bore in the reversing piston, with the annular groove provided in the central region.

In a general way it may be added that in accordance with an aspect of the invention that a reversing means having a reversing piston is provided within the interior of the respective auxiliary piston, and that a spring is disposed in a pressure space. The reversing means or converter can connect—in conformity with the prevailing pressure conditions between the demand point and the load-sensing channel, line or conduit—the mentioned pressure space either with the demand point, or with the load-sensing channel or conduit.

Furthermore, a control edge is provided at the reversing piston, and this control edge can be used to lower the pressure acting forwardly of the auxiliary piston to that pressure level prevailing at the respective demand point. This means that the load-sensing conduit is supplied with energy from the input conduit, or conveying conduit or line, for the associated pump, and this is achieved at the pressure level of the demand point.

This serves to overcome the disadvantage of prior art systems which are characterized by the withdrawal of energy, or power take-off, from the conduit which leads to the demand point so that the demand point can be subjected to sink-back under load conditions.

In contrast thereto, in accordance with this invention the conduit or line leading to a demand point is only used to obtain a pressure-related signal, i.e., one determines only the magnitude of the prevailing pressure in the conduit or line, and no power or energy is withdrawn from this conduit.

BRIEF DESCRIPTION OF THE DRAWING

The above and other objects, features and advantages of the invention will become apparent from the following description, reference being made to the accompanying drawing in which.

SPECIFIC DESCRIPTION

Hydraulic System

Figure 1:
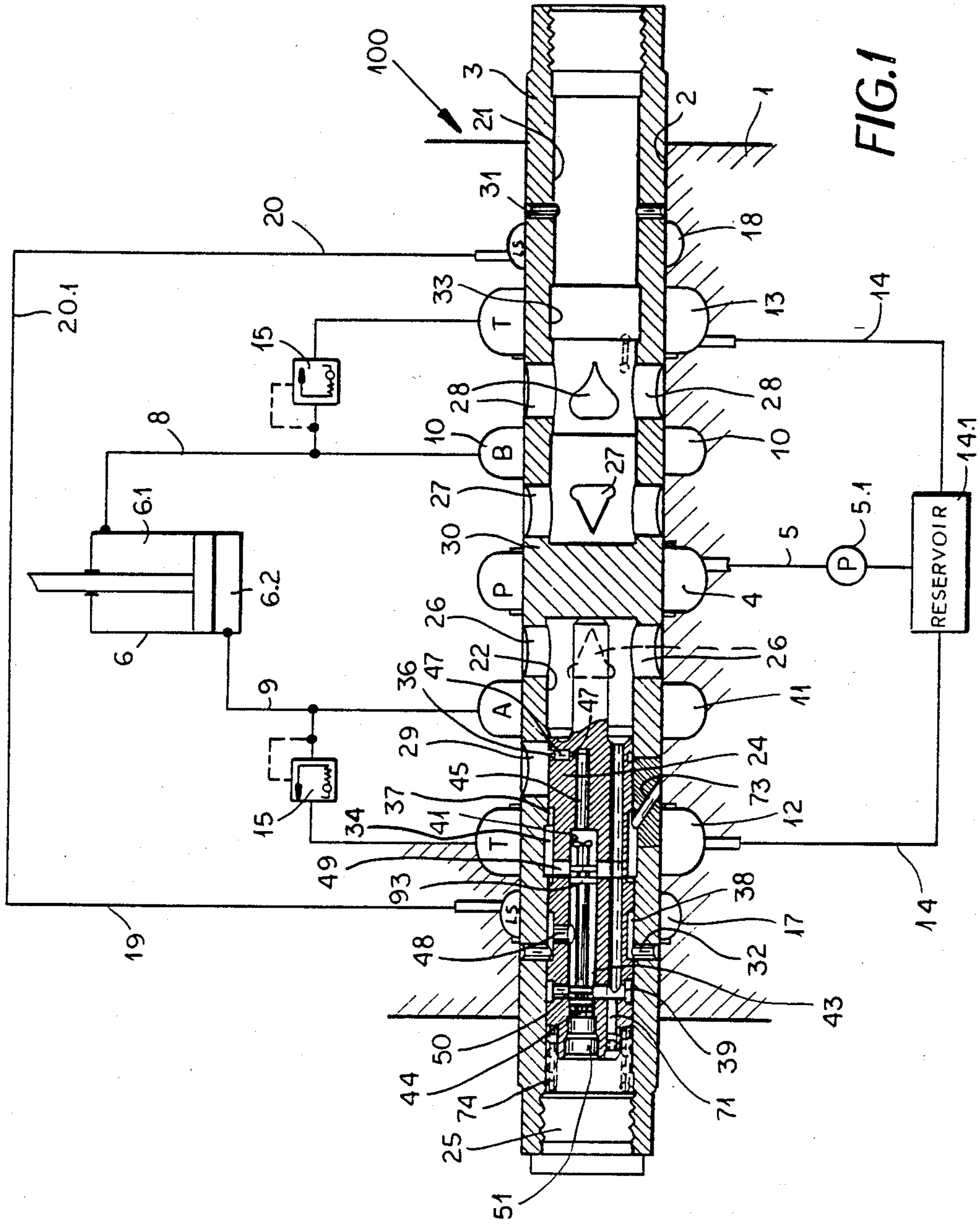
FIG. 1 is schematic and partial cross-sectional view showing the neutral position of the main piston and the displacement of the auxiliary piston by the respective spring.
Figure 8:
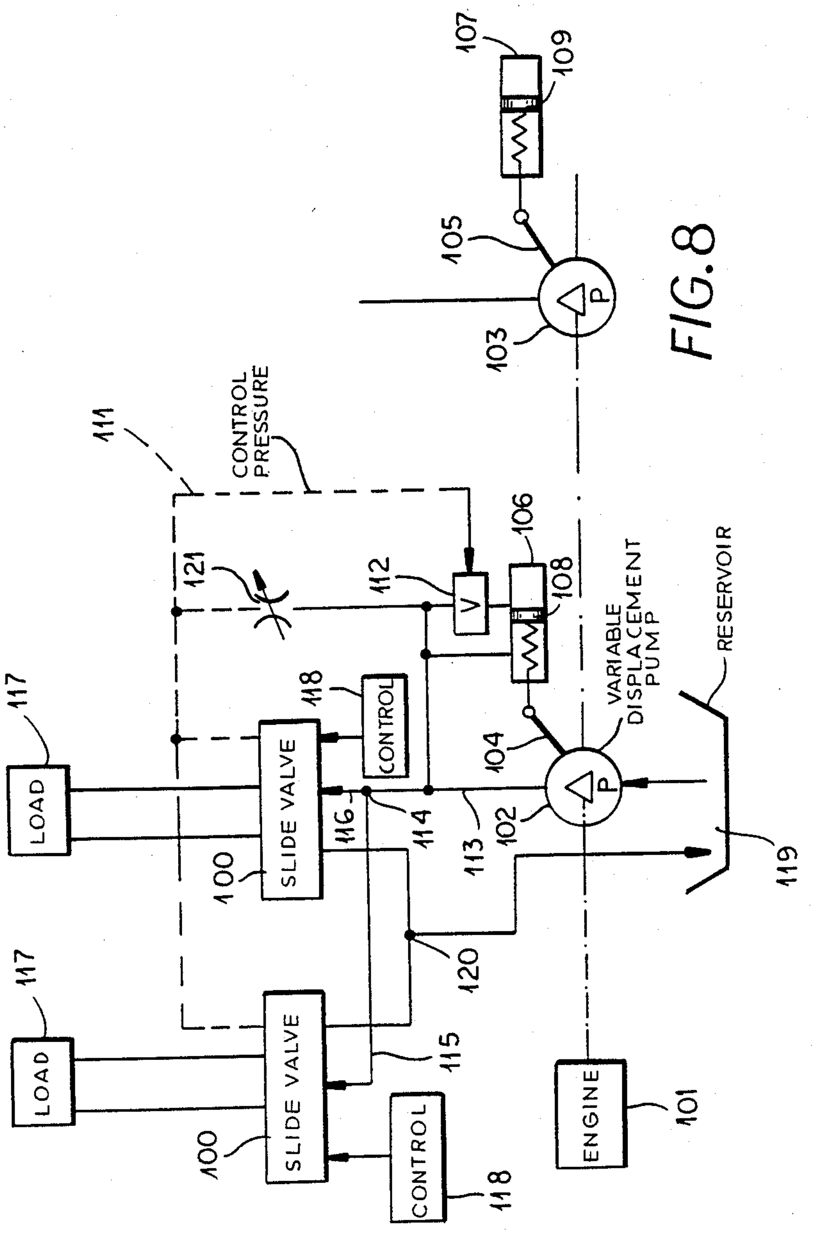
FIG. 8 is a diagram showing the application of the slide valve of the invention to a hydraulic system.

FIG. 1 shows a slide valve 100 which can be used in a hydrostatic system described in detail in DE-OS No. 34 13 866. More simply understood, however, will be the system illustrated in FIG. 8 which shows an engine or other prime mover 101 driving a number of variable—displacement pumps 102, 103 . . . which are essentially equivalent in function to the pump 5.1 to be described below.

The pumps 102, 103 . . . each have a control member 104, 105 . . . displaceable by a pump-setting unit 106, 107 . . . . Each pump setting unit can include a spring-loaded piston 108, 109 . . . whose position is controlled by a control pressure 110 delivered by a control pressure line common to the units served by the pump and operating a pressure-controlled valve 112. The hydraulic system also includes a main pressure line 113 which is branched at 114 so that each branch 115, 116 . . . , feeds a respective slide valve 100 servicing a respective load 117. Blocks 118 represent the ability to selectively control the loads. The hydraulic return Line to the reservoir 119 is shown at 120. In this system a variable throttle 21 represents a means for generating a control pressure.

The load-sensing responsiveness of the slide valves 100 has been described in DE-OS No. 34 13 866 and is discussed below as well.

Slide valves

A longitudinal bore 2 is provided in housing 1, and the main or primary piston 3 can reciprocate in the bore 2 of housing 1.

Various annular grooves are formed in the wall which forms the longitudinal bore 2. Thus, the annular groove or chamber 4 is connected by way of the channel, line, or conduit 5 to the pump 5.1 for the system.

One load point, also referred to as a demand or consumption point hereinafter, is represented by the cylinder-piston assembly comprised of the cylinder 6 and the respective reciprocable piston 7.

A first supply line or conduit 8 leads to the upper pressure chamber 6.1 of the cylinder-piston assembly from the annular groove or chamber 10 in the housing 1. This annular groove 10 lies to the right of annular groove 4. A second supply line or conduit 9 leads to the lower pressure chamber 6.2 of the cylinder-piston assembly to the annular groove or chamber 11 in the housing 1. This annular groove 11 lies to the left of the annular groove 4.

Furthermore, two outer annular grooves or chambers 12 and 13 are provided concentrically with respect to the bore 2, and these two annular grooves 12 and 13 are respectively connected to a reservoir 14.1 by way of the conduits or lines 14. The reservoir 14.1 serves as the storage for a supply of the hydraulic or fluid pressure medium.

A pressure relief valve 15, is provided in each conduit 8 and 9 which leads to the demand point represented by the cylinder-piston assembly with cylinder 6, and are connected to the conduits 14, respectively, by the annular grooves 12 and 13.

Two load-sensing annular grooves or chambers 17 and 18 are provided concentrically with respect to the bore 2, and these are respectively connected to a common control pressure conduit or line 20.1 by the conduit or line 19 for annular groove 17, and of the conduit or line 20 for annular groove 18.

Figure 2:
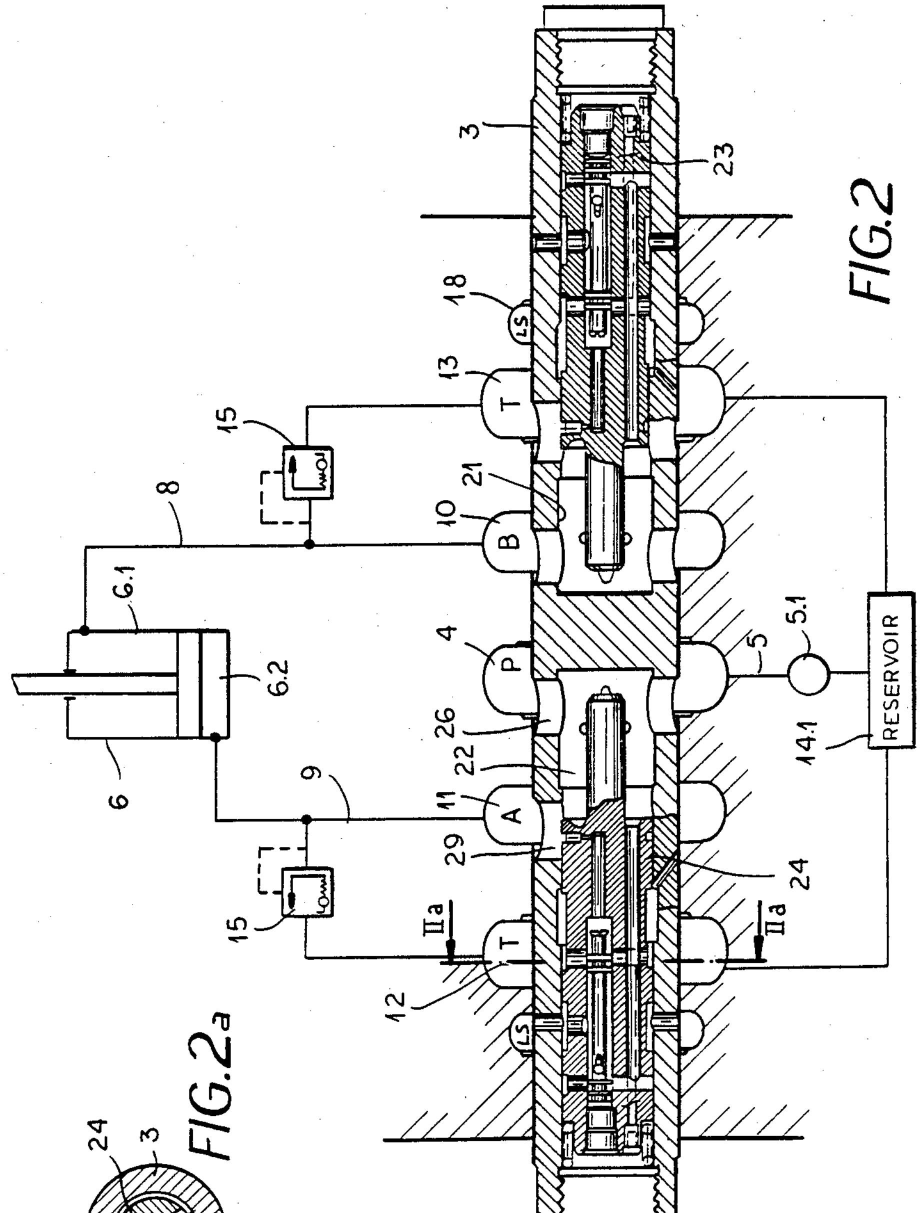
FIG. 2 is a view similar to that of FIG. 1 and also showing the right-hand side auxiliary piston.
Figure 2A:
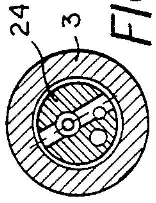
FIG. 2*a* is a cross section along line IIa—IIa in FIG. 2.

Longitudinal or axial central bores or chambers 21 (right) and 22 (left) are provided on the main piston 3. The right-hand chamber 21 serves to accommodate the auxiliary piston 23 (FIG. 2), and the left-hand chamber 22 serves to accommodate the auxiliary piston 24. Each auxiliary piston 23 and 24 is typically biased by a spring 74. Each spring 74, in turn, is supported by a plug 25 which closes a respective chamber 21 and 22.

Figure 4:
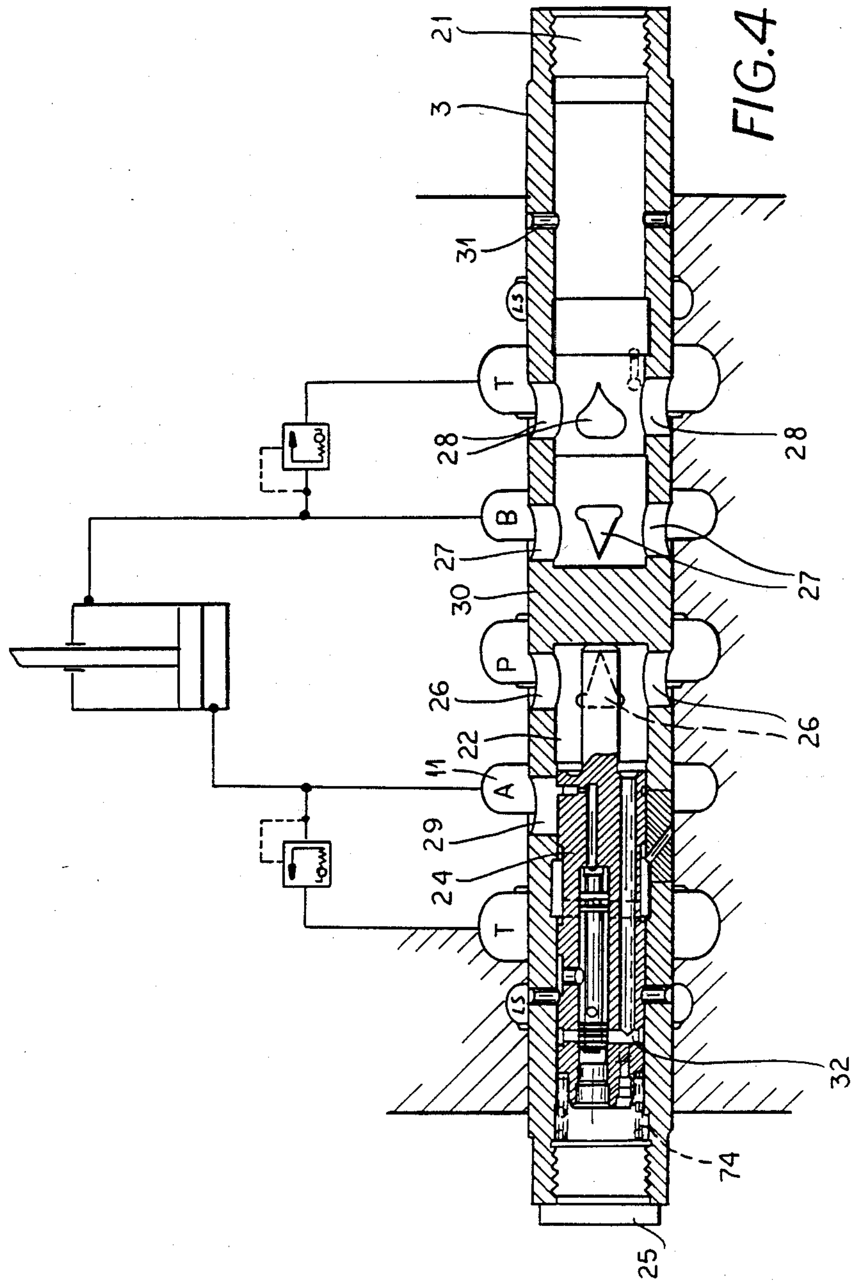
FIG. 4 is a view similar to that of FIG. 1, but showing a different control position of the main piston.
Figure 5:
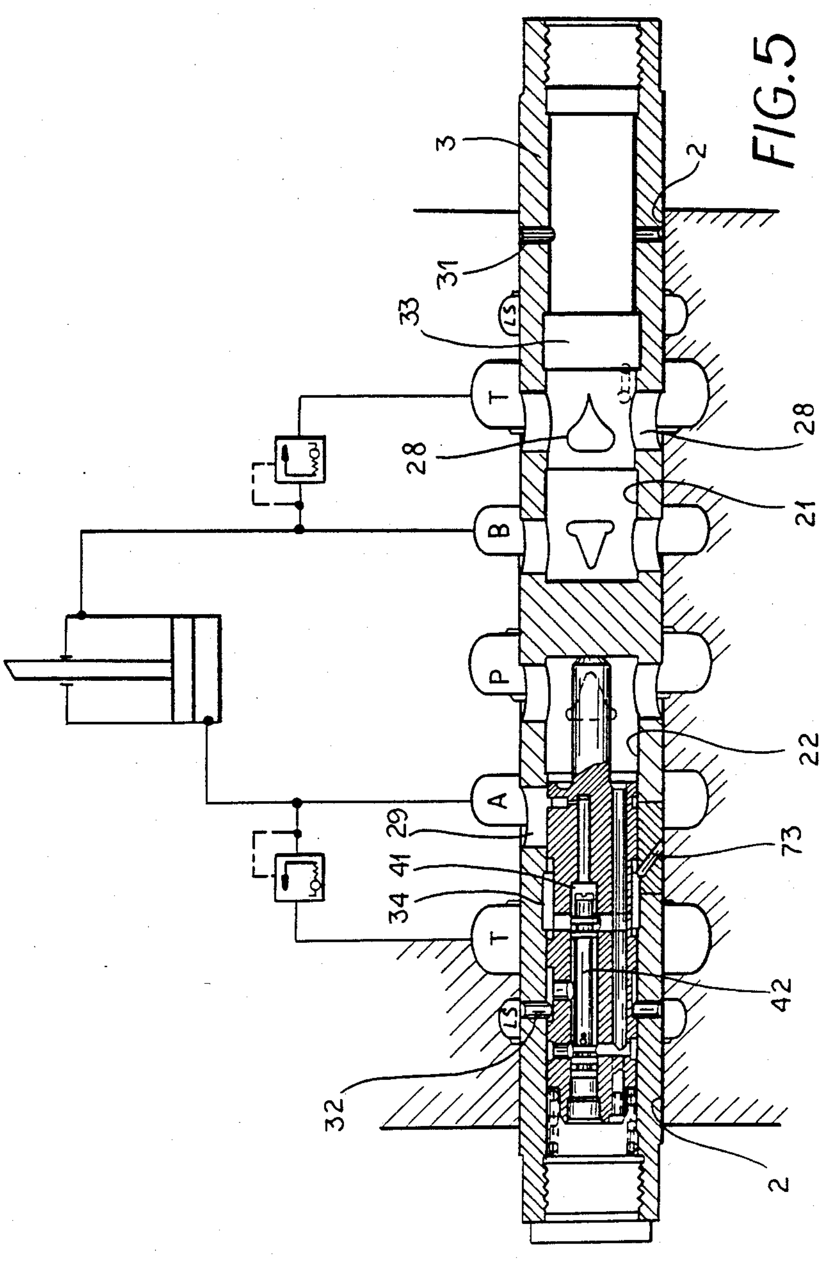
FIG. 5 is a view similar to that of FIG. 4, but showing a different control position of the left-hand reversing piston.
Figure 7:
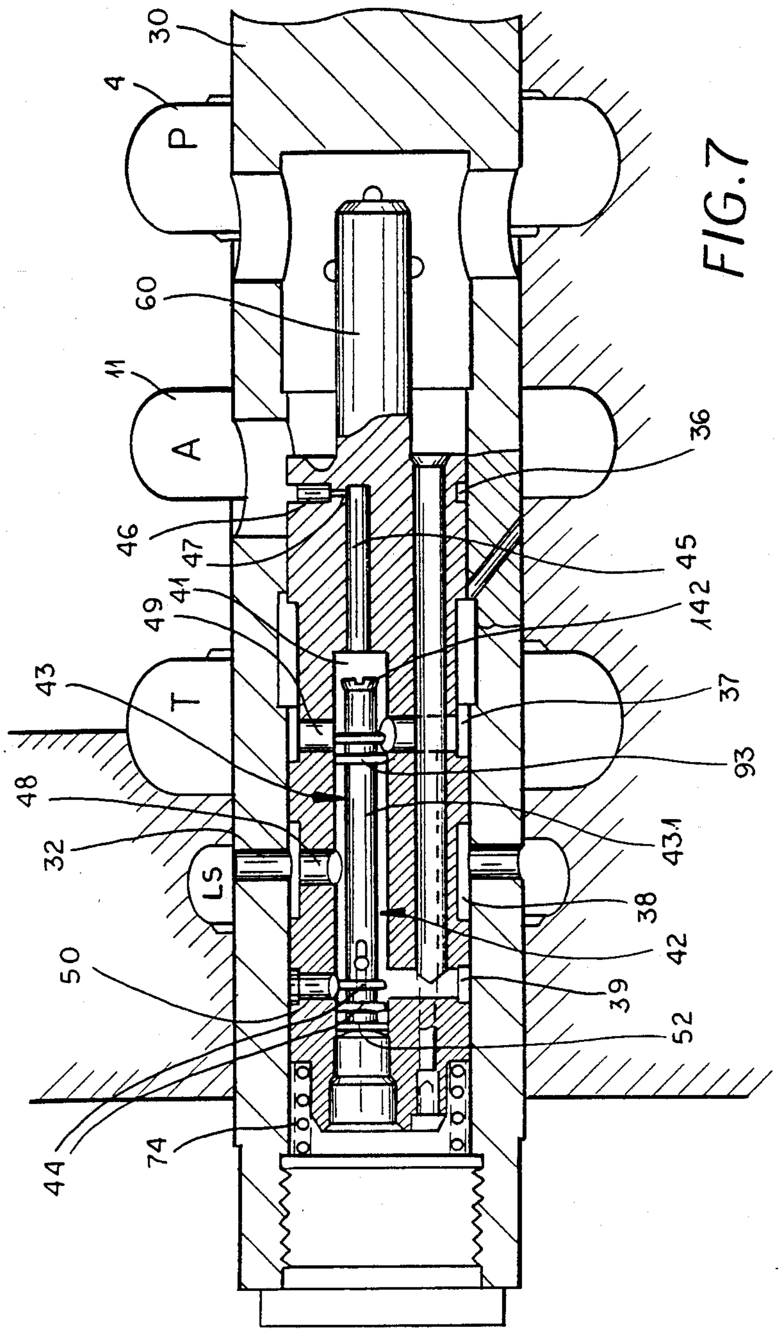
FIG. 7 is a cross-sectional view showing the details of the auxiliary piston and reversing piston drawn to a larger scale.

The piston 3 is further formed with a plurality of radially extending passages, namely, the three centrally disposed passages 26 and 27, and spaced from these the outer passages 28 and 29, respectively (only one passage 29 is shown in FIG. 4).

A partition wall 30 remains between the opposing ends of the axial chambers 21 and 22.

Radially extending through-bores 31 and 32 are provided near the outer ends of the piston 3.

An annular groove 33 is provided in the hollow main piston 3, between the through-bore 31 and the outer passages 28 in the right-hand chamber 21. Similarly, an annular groove 34 is provided between the through-bore 32 and the outer passages 29 in the left hand bore 22.

Each auxiliary piston 23 and 24 is provided with four exterior or circumferential annular grooves which are identified by reference numerals 36, 37, 38, and 39, respectively.

Each auxiliary piston 23 and 24 is also provided with a reversing piston bore or piston chamber 41 for accommodating a respective reversing piston 42. A reversing piston 42 typically includes a central rod portion 43.1 extending between a first or forward group of piston ring formations 93 and a second or rearward group of piston ring formations 44. A contact extension 142 of the reversing piston 42 extends towards the central portion of the main piston 3, i.e. beyond or from the first group of piston ring formations 93 and towards the wall 30.

Each auxiliary piston 23 and 24 is, furthermore, equipped with a longitudinal connecting bore 45 which extends towards the wall 30 and communicates the piston chamber 41 with a radial outlet bore 46. The transverse or radial bore 46 includes a constriction 47 which can provide the function of a throttle location or throttle.

A further radial, transverse, outlet bore 48 opens at the central region of the piston chamber 41 to communicate the piston chamber 41 with the annular groove 38. A further radial bore 49 is provided between the radial bore 46 and the radial outlet bore 48, and this radial or transverse bore 49 opens at the annular groove 34 of piston 3 in the position shown in FIG. 1. A further radial outlet bore 50 is provided at the rearward end and this bore 50 opens at the annular groove 39. Each piston chamber 41 is closed by a plug 51.

Figures 3, 6:
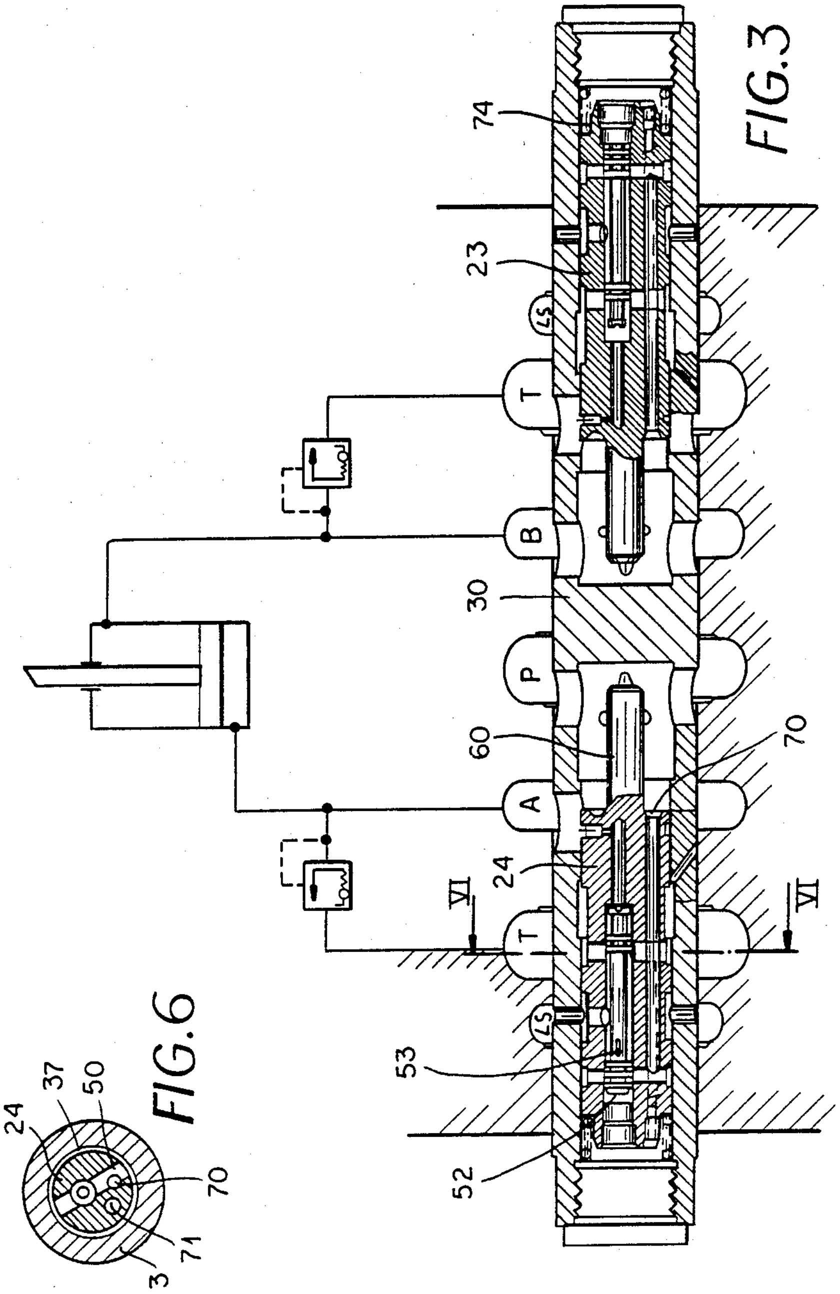
FIG. 3 is a view similar to that of FIG. 2, but showing a different control location of the left-hand reversing piston.
FIG. 6 is a cross section along line VI—VI in FIG. 3 and appears on the sheet with FIG. 3.

A longitudinal bore 52 (FIG. 3) is provided in the rearward end of each reversing piston 42, and a radial bore 53 connects the bore 52 with the annular groove or space 43 surrounding the central rod portion 43.1 of each reversing piston 42, i.e. the space of piston chamber 41 between the forward group of piston ring formations 93 and the rearward group of piston ring formations 44.

Each auxiliary piston 23 and 24 typically also includes a forward or contact end 60 of reduced diameter, and this can come in contact with the wall 30 of the main piston 3, whereby the forward edge 61 (FIG. 1) of the respective auxiliary piston can be held at a fixed distance away from the center of the main piston 3.

A longitudinal connecting bore 70 (FIGS. 3 and 6) extends in each auxiliary piston. The bore 70 extends from the radial bore 50, parallel to the longitudinal central axis of an auxiliary piston 23 and 24, respectively, and it extends fully through the auxiliary piston, i.e., it terminates in the wall (FIG. 3) which is directed towards the central portion, i.e., wall 30 of the main piston 3.

The annular groove 34 which extends concentrically with respect to the chamber 22 or in the wall which forms the chamber 22 (FIG. 1) in the main piston 3, is in communication with the outer annular groove 37 of the auxiliary piston 24, and it is also in communication with the exterior of the piston 3 by way of the inclined connecting bore 73. This can occur in that region of the outer wall of piston 3 which can be in communication with the annular groove 12 in the wall which forms the bore 2, on corresponding shifting of the main piston 3.

Upon axial displacement or shifting of the main piston 3 (to the right as suggested in FIG. 2), one can achieve, at least with respect to the left-hand auxiliary piston 24, by way of the radial passages 26, the interior space or volume of chamber 22, and the radial passages 29, a communication between the pump conduit or line 5 and, accordingly, the annular groove 4 and the annular groove 11, and as well to the line 9 which leads to the lower pressure chamber 6.2 of the cylinder-piston assembly which represents a demand point. The edge or border of a radial passage 26 and the edge of the annular groove 4 provide the functions of an indicator throttle location or indicator throttle.

A respective radial passage 26 is shaped in such a way that the effective area or cross-section—on shifting of the piston 3—increases in accordance with a specific or predetermined characteristic. Fluid or a pressure medium flow from the radial passage 26 to the radial passage 29 is retarded or throttled at the edge or border of the radial passage 29 by the forward edge 61 of the forward end of the auxiliary piston 24.

This auxiliary piston 24, accordingly, performs the functions of a parallel control throttle location or parallel throttle. It also performs the functions of a pressure piston manometer.

When the piston 3 is moved to the right, such that the annular grooves 4 and 11 are in communication with each other, the pump pressure impacts on the forward face or end of the auxiliary piston 24 and is passed from the space or volume in the chamber 22 ahead of this end, via the control edge—which acts as the throttle—to the space in the chamber 22 ahead of the rearward end of face of the auxiliary piston 24, which is associated with the outer end of the main piston 3, and in which space is arranged the respective spring 74.

This spring 74 pressurizes the auxiliary piston 24 in the forward direction, i.e., towards pressure space which is provided ahead of the forward end of the auxiliary piston 24 and which is disposed near the wall 30 of the main piston 3.

Alongside bore 71, but in a different plane, there extends the longitudinal bore 70. The bore 70 extends from the annular groove 39 to the other annular groove 38, which is, in turn, connected to a load-sensing channel, to the other annular groove. The bore 73 in the main piston 3 serves as pressure relief of the outer space, i.e., the auxiliary piston 24 is shifted in the direction towards the outer part or end of the piston 3 when the outer mouth of the bore 73 is positioned ahead of the annular groove 12 (or 13, respectively,) connected to the reservoir 14.1.

The reversing piston 42 includes a reversing function and additionally controls the pressure—at which the pressure-responsive signal is sensed—to the demand level or condition.

The pressure signal is given by the demand pressure. However, the energy, as mentioned, is withdrawn from the pump channel or line in order to preclude a pressure drop or sinking-back occurring at the consumer or demand point. This means, in conformity with the reversing piston 41 one will - when the reversing piston 42 has been moved in the direction of the outer end of the piston 3, connect the demand point controlled by this piston with the annular groove 17 and, accordingly, the common control pressure conduit 19 [20.1].

In the event that another demand point, which is controlled, in turn, by another piston, is operated at a pressure greater than the pressure prevailing at the demand point controlled by the piston 3, this greater pressure is transmitted via the line 19, the annular groove 17, the bore 48, the annular groove or space 43, the bore 53 and the longitudinal bore 52 into the pressure space ahead of the forward end of the reversing piston 42. This means that a greater pressure exists in this space in comparison with the space which is closer to the center of the piston 3. Further, this means that the reversing piston 42 within bore 41 is displaced in the direction towards the center of the piston 3, and the piston ring formation 93 assumes a corresponding position with respect to the radial bore 49.

The pressure space ahead of the auxiliary piston 23 or 24, respectively, in which the spring 74 is housed, is connected either to the actuated or controlled demand point, or to the load-sensing lines 19 or 20, respectively, due to the reversing function of the piston 42. The reversing piston 42, however, also acts as pressure reducing throttle valve with reference to the radial bore 50.

The inventive system precludes short-circuiting or shut-downs in the system between the demand connection and the load-sensing lines or channel, whereby in such events energy will be wasted and the danger can arise that the demand points which are subject to a respective load would be moved involuntarily under this load. The invention, furthermore, enhances the fine-tuning of the valve response or enhanced control behavior.

I claim:

1. A control valve for use in a hydraulic system, said system including a variable-speed pump, said pump having at least one control element;

a reservoir for storage of a hydraulic pressure medium;

a return conduit which leads to said reservoir;

a pump control piston connected to said control element and displaceable in a respective pump control cylinder;

means for generating a control pressure which can displace said pump control piston so that the position of said pump control piston is determined by said control pressure;

a conveying conduit connected to said pump for feeding the pressure medium to a plurality of demand locations;

control elements connected to said conveying conduit;

at least one branch line to bring the respective fluid to a respective demand location from said conveying conduit;

at least one self-movable valve arranged in said branch line for connecting a respective demand location with said conveying conduit;

a common control pressure conduit at said control pressure;

for each branch line at least one adjustable parallel control throttle having an adjustment element and at least one spring, whereby the respective adjustment element of each parallel control throttle can be impacted at one side by the pressure prevailing in the respective branch line and on the other side by a respective control pressure of said at least one spring, and whereby the control pressure is of equal magnitude at any parallel control throttle of a respective demand point; and a control pressure branch conduit for connecting said one side of the control element of the parallel control throttle to said common control pressure control conduit; and in which each conveying pressure branch line leading to a demand point formed with a controllable indicator throttle in said valve, and in the flow direction this indicator throttle the control pressure branch line is connected, and whereby on at least one side of the respective piston there is provided a longitudinal bore in the piston in which is mounted an auxiliary piston which can be moved in reference to the force of said spring, and the auxiliary piston together with a part of the piston of said valve performing the parallel control throttle functions, the improvement which comprises:

a reversing piston chamber in said auxiliary piston, a reversing piston for each reversing piston chamber which can be shifted by having said pressure medium impacting at a forward end thereof, and which has a central rod portion of reduced diameter with respect to which said reversing piston chamber can form an annular groove, a transverse bore formed in said auxiliary piston for communicating said reversing piston chamber at said annular groove occupied by said central rod portion of reduced diameter of said reversing piston and said common control pressure conduit, a transverse bore formed in said auxiliary piston for bringing pressure medium to the rearward end of said auxiliary piston, and a rearward transverse bore formed in said auxiliary piston for bringing pressure medium to the forward end of said auxiliary piston whereby under predetermined control conditions the space forwardly of said reversing piston can be connected to a respective conduit leading to a demand point, and whereby the space of said reversing piston chamber at the rearward end of said reversing piston can be communicated with said annular groove which surrounds said central rod portion of reduced diameter of said reversing piston.

2. The valve defined in claim 1 wherein the space in the body of the auxiliary piston forwardly of said reversing piston is connected by way of a longitudinal bore to a respective conduit leading to a demand point.

3. The valve defined in claim 1 wherein the space in the body of the auxiliary piston forwardly of said reversing piston is connected to a respective conduit leading to a demand point by way of a radial bore.

4. The valve defined in claim 3 wherein said radial bore includes a constriction performing functions of a throttle.

5. The valve according to claim 1 wherein the first mentioned transverse bore is connected by a respective supply conduit to said common control pressure conduit for communicating it and said reversing piston chamber at said annular groove occupied by said central rod portion of reduced diameter of said reversing piston.

6. The valve according to claim 1 wherein said auxiliary piston has a forward end of reduced diameter and a rearward end adapted to be biased by said spring.

7. The valve according to claim 1 wherein said transverse bore for bringing pressure medium to the space ahead of the rearward end of said auxiliary piston is operatively connected to a jet-nozzle formation.

8. a control valve for use in a hydraulic system, said system including a variable-speed pump means including at least one pump control piston;

a reservoir for storage of the respective pressure medium and connected to said variable-speed pump means;

means for generating a control pressure which can actuate said pump control piston so that the position of said pump control piston is determined by said control pressure;

a least one conduit for conveying a pressure medium in conformity with the prevailing control pressure;

a conveying conduit connected to said pump to emanate thereat and adapted to bring the pressure medium to demand locations, and said valve including:

a housing providing a cylinder chamber;

a main piston reciprocatingly arranged in said housing and adapted to be displaced in conformity with the movement of the pressure medium, and said main piston including at least one auxiliary piston chamber;

an auxiliary piston reciprocatingly arranged in said at least one auxiliary piston chamber, said auxiliary piston having a forward end adapted to be subjected to the pressure of the pressure medium, and having a rearward end adapted to be subjected to the pressure medium and the pressure of a respective spring; and said auxiliary piston including at least one reversing piston chamber;

a spring mounted in said at least one auxiliary piston chamber for biasing said auxiliary piston; and a reversing piston reciprocatingly arranged in said at least one reversing piston chamber, said reversing piston including (a) a forward contact end adapted to contact the respective end of said at least one reversing piston chamber, (b) a first group of piston ring formations near the forward contact end, (c) a second group of piston ring formations near the rearward end of said reversing piston, and (d) a central rod portion extending between said first group of piston ring formations; and said auxiliary piston, said main piston and said housing having conduit means including a plurality of passages for (a) communicating said reversing piston chamber occupied by said central rod portion with said at least one conduit for conveying a pressure medium in conformity with the prevailing control pressure;

(b) for bringing pressure medium to the rearward end of said auxiliary piston;

(c) for bringing pressure medium to the forward end of said auxiliary piston;

(d) for connecting, under predetermined control conditions, the space forwardly of said reversing piston to a respective conduit leading to a demand point; and (e) for communicating the space of said reversing piston chamber at the rearward end of said reversing piston with the respective annular groove which surrounds said central rod portion.

9. The valve according to claim 8 wherein said main piston has two auxiliary cylinder chambers, and wherein each piston cylinder chamber is occupied by a respective auxiliary piston, whereby the forward end of each auxiliary piston can selectively contact the partition between said two auxiliary cylinder chambers.

10. The valve according to claim 8 wherein said reversing piston chamber is adapted to be closed by a plug.

11. The valve according to claim 8 wherein said at least one auxiliary piston chamber is adapted to be closed by a plug.

12. A control valve for use in a hydraulic system, said system including a variable pump with at least one control element, said control element being connected to a pump control piston arranged in a pump control cylinder and the position of which is determined by a control pressure, said drive system further including a conveying conduit connected to said pump and a return conduit which leads to the reservoir and, furthermore, including flow control elements for directing flow through the central valve, whereby at the conduit emanating from the pump are connected—by intervention of a respective branch line—several demand points which respectively can be connected to the conveying conduit by means of a, randomly actuatable valve in the respective branch line, whereby in each branch line there is provided an adjustable parallel control throttle position, whereby a respective flow control element is provided for each of these parallel control throttle positions and can be impacted on the one side by the pressure of the conveying branch-conduit and on the other side by the control pressure and a spring, and the control pressure is of equal magnitude at all control throttle locations associated with each demand point and for this purpose this control pressure impacted side of the flow control element of the parallel control throttle location—via a control pressure branch conduit—is connected to a common control pressure conduit;

whereby in the respective conveying pressure branch line leading to a demand point, there is formed a controllable indicator throttle location in the valve, and in the flow direction behind this indicator throttle location the control pressure branch line is connected, whereby on at least one side of the piston and in the piston there is provided a longitudinal bore in which is mounted an auxiliary piston which can be moved in reference to the force of a spring, which auxiliary piston together with a part of the piston of the valve forms the parallel control throttle location, the improvement wherein, in the auxiliary piston is arranged a reversing piston bore in which is arranged a reversing piston which can be shifted by having impacting at its respective frontal end a pressure and having in its central region an annular groove, whereby in the central region of the reversing piston bore merges a transverse bore which is connected to the common control pressure line and laterally from this transverse bore two more transverse bores are provided of which that transverse bore which is nearer to the spring-loaded end of the auxiliary piston is connected to the frontal end of the auxiliary piston which is facing away from the spring loaded end, and the other transverse bore is connected by way of a jet-nozzle formation with the spring-side frontal face of the auxiliary piston, and whereby a space in front of this frontal face is in communication with a further bore which is connected to a transverse bore in the piston of the valve and connected to the transverse bore in the auxiliary piston, said transverse bore in the controlled or actuated condition of the auxiliary piston being connected to the conduit leading to the demand point, a space ahead of the end of the further bore which is facing towards the spring side of the auxiliary piston being connected with an annular groove in a central region of the reversing piston.

13. The improvement defined in claim 12 wherein in the bore which connects the space ahead of the frontal face of the reversing piston directed towards the center of the piston and the demand point there is provided a throttle location.

* * * * *